July 2, 1935.    I. HECHENBLEIKNER    2,006,693
METHOD OF RECLAIMING PICKLING SOLUTION
Original Filed June 15, 1927
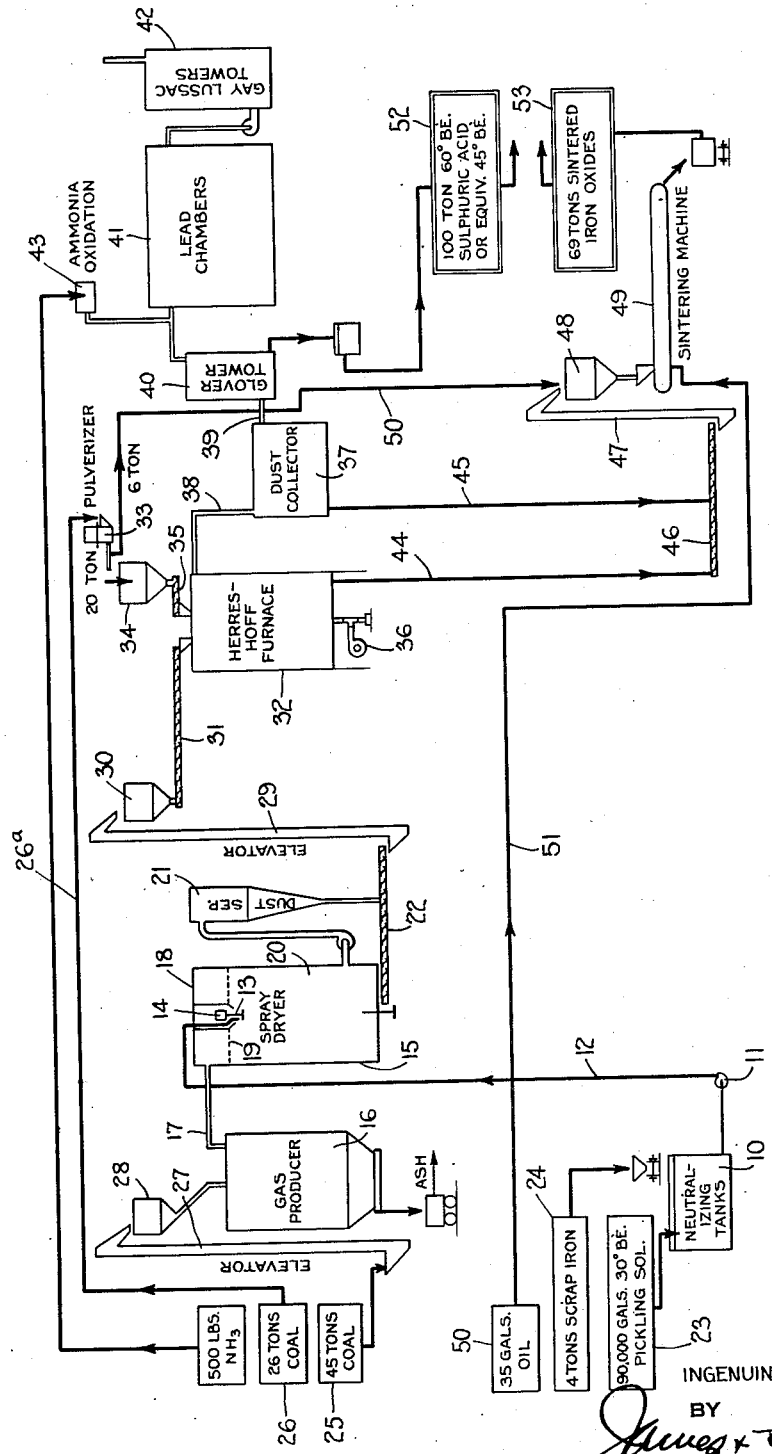
INVENTOR
INGENUIN HECHENBLEIKNER
BY
James & Franklin
ATTORNEYS Patented July 2, 1935

2,006,693

UNITED STATES PATENT OFFICE 2,006,693

METHOD OF RECLAIMING PICKLING SOLUTION

Ingenuin Hechenbleikner, Charlotte, N. C., assignor to Chemical Construction Corporation, Charlotte, N. C., a corporation of Delaware Original application June 15, 1927, Serial No. 198,903. Divided and this application May 3, 1932, Serial No. 608,900

5 Claims. (Cl. 23—177)

This invention relates to a method of reclaiming pickling solution, and relates more particularly to a process of converting waste pickling solutions into sulphur dioxide gas and iron oxide products for further use in the arts.

The prime desideratum of my present invention centers about the provision of an economical process for reclaiming or restoring the otherwise waste constituents of pickling solution and for converting the same into sulphur dioxide gas suitable for the economic production of sulphuric acid and into iron oxide suitable for further use in the industries, as for example in blast furnaces and iron and steel reproducers.

This application is a division of my copending application for Method of reclaiming pickling solution, Serial No. 198,903, filed June 15, 1927.

In reclaiming the iron sulphate or pickling solution, I have discovered that a substantial concentration of sulphur dioxide gases highly suitable for use in the manufacture of sulphuric acid by the well known lead chamber process may be obtained or produced by roasting a dried or powdered sulphate obtained from the pickling solution with a fuel such as powdered coal, the roasting process yielding a sulphur dioxide gas of the desired concentration and further yielding an iron oxide cinder having a very low sulphur content. I have further found that the iron oxide yield produced in this roasting step is of such a character that when such iron oxide is sintered there is produced a sintered iron oxide product of extremely low sulphur content which can be used over again in the blast furnaces.

In practicing this roasting of the dried sulphate with powdered or pulverized coal, I have found that to assist in producing a sulphur dioxide gas of a high concentration the iron sulphate used in the roasting furnace should have as little water of crystallization as possible. To accomplish this I have discovered that the spray drying of the pickling solution carried out at high temperatures is effective for yielding an iron sulphate powder having the low aqueous content desired. By evaporating the pickling solution in the spray dryer at high temperatures I am enabled to obtain an iron sulphate powder having only one molecule of crystallization; and this powdered iron sulphate I have found can be efficaciously used in the roasting step to make a sulphuric acid component of high concentration.

The principal objects of my invention therefore include the provision of a process comprising the step or steps, and the method consisting of the steps of spray drying the pickling liquid to $FeSO_4.H_2O$ powder, and of roasting of the powdered sulphate with powdered coal producing a sulphur dioxide gas of high concentration and $Fe_2O_3$ cinder. By this process I am enabled to produce a 6% sulphur dioxide gas which is converted into a 60° sulphuric acid, and I am enabled to produce an $Fe_2O_3$ cinder which is converted into a sintered $Fe_2O_3$ with less than 0.1% sulphur.

To the accomplishment of the foregoing and such other objects as will hereinafter appear, my invention consists in the elements and their relation one to the other, as hereinafter more particularly described and sought to be defined in the claims, reference being had to the accompanying drawing which shows the preferred embodiment of my invention, and in which:

The figure is a diagrammatic layout of a plant designed for practicing the method of my invention, the drawings showing a plant layout intended for obtaining a yield of sulphuric acid of about 100 tons, and a yield of iron oxide of about 69 tons per day.

In the complete process, starting with the pickling solution and ending with the sulphuric acid and sintered iron oxides, the method of the invention comprises the following four steps:

(1) The spray drying of the pickling liquid to a mono-hydrous iron sulphate powder, after eventual neutralization.

(2) The roasting of the powdered dried sulphate with powdered or pulverized coal and the production of 6% sulphur dioxide gas and $Fe_2O_3$ cinder.

(3) The conversion of the sulphur dioxide gas to 60° sulphuric acid, and (4) The sintering of $Fe_2O_3$ cinder to sintered $Fe_2O_3$ with less than 0.1% S.

These steps of the process I will now describe in detail in the order above stated, referring to the drawing showing the apparatus employed with the steps of the process.

(1) *Concentration by spray drying of the liquid.*—The concentration to a dryness of the pickling solution is in the preferred practice of the invention made in one step in a spray drying apparatus especially constructed to be used with intensified hot gases. As fuel, either waste coke oven gas, producer gas or cheap oil can be used. In the exemplification of the invention as shown in the drawing, I show the use of a gas producer in association with a spray drying apparatus.

Referring now to the drawing, the pickling solution which is obtained from the neutralizing tanks 10 is pumped by means of the blower 11 through the feed line 12 in the direction indicated by the arrow to and into a spray dryer 13 run at high speed by a motor 14 and arranged in a spray drying chamber 15. The hot gases employed to evaporate to dryness the pickling solution in a minimum of time is obtained from a gas producer 16 having a gas conduit 17 which communicates with an upper gas chamber 18 forming part of the spray dryer 15. The spray dryer is provided with an orificed partition 19 which subdivides the drying apparatus into the upper gas chamber 18 and the lower spray drying chamber 20.

Preferably the spray drying apparatus 15 embodies a construction of the type disclosed and claimed in my copending application, Serial No. 192,464 for Atomizing apparatus, filed May 18, 1927; now Patent No. 1,853,682, dated April 12, 1932, and in the preferred construction the spray drying apparatus consists of a drying chamber built of reinforced concrete, the rotating disc 13 of said sprayer being made of an acid proof material. In the desired plant layout the spray drying equipment consists of two spray dryer units each associated with a high force centrifugal dust collector such as 21 for the purpose of recovering the dust, the product obtained in the spray dryer 15 and dust collector 21 being fed to a screw conveyor 22 for further use in the process. The hot gases coming from the gas producer enter the dryer at a temperature of 300° to 600° C., these high temperatures being preferred to evaporate the pickling solution to dryness in a minimum of time for the obtaining of the powdered sulphate having the low aqueous content.

The plant layout shown in the drawing is designed for producing a 100 ton yield of sulphuric acid and a 69 ton yield of sintered iron oxides, and therefore the arrangement shown in the drawing is based upon the use of about 90,000 gallons of pickling solution of 30° Bé. containing 2% free sulphuric acid, all as shown by the legend block 23. For neutralizing this amount of pickling solution there is employed about 4 tons of scrap iron as diagrammatically represented by the legend block 24. The requirement of fuel for the whole process is diagrammatically represented by the legend blocks 25 and 26, the former representing the amount of coal used in connection with the gas producer 16, the same being fed to the gas producer by means of an elevator 27 feeding into a hopper 28.

By employing this spray dryer method of evaporating the pickling solution, the concentration may be obtained in one step and the produced material needs no further drying previous to the roasting, as would be the case with a steam evaporated product. It will be noted that this step of the process utilizes relatively few parts of machinery, only the inexpensive parts of which come into contact with the corrosive liquor, reducing repairs to a minimum. It has been found that the operation of this step is simple, requires little labor, and is effective for producing iron sulphate with one molecule of water or less.

(2) *The roasting:*—The roasting of the powdered sulphate is preferably carried out in Herreshoff furnaces modified for the particular use of this process. The necessary heat for carrying out the roasting process is furnished by powdered coal as fuel, the roast gases obtained containing mainly sulphur dioxide and carbon dioxide, besides a mixture of oxygen and nitrogen. In the preferred plant layout the roasting equipment consists of three furnaces, one of which for simplicity of illustration is shown in the drawing.

The powdered iron sulphate product obtained in the first step of the process is conveyed by means of the screw conveyor 22 to an elevator 29 which feeds the powdered sulphate into a hopper 30, the latter communicating with a screw conveyor 31 feeding the powdered sulphate into the Herreshoff furnace 32. Coal obtained from a pulverizer 33 is fed to a hopper 34 which also communicates with a screw conveyor 35 feeding the powdered material into the roasting furnace. The air required for combustion is supplied by a fan or blower 36. As shown in the drawing, preferably about 20 tons of coal are employed in the roasting step for the sulphate product obtained from the assumed starting amount of pickling solution above described (90,000 gallons 30° Bé.). With these proportions given, 20 tons of coal are used with 150 tons FeSO$_4$.1H$_2$O, and thus coal is used in the roasting step of an amount of the order of 12% of the mixture of the coal and sulphate product.

By means of this roasting process I am enabled to obtain a 6% sulphur dioxide gas and a Fe$_2$O$_3$ cinder capable of use as aforesaid in the subsequent steps of the process which will now be described.

(3) *Conversion of the gases into sulphuric acid:*—The gases obtained in the furnace 32 are led to a sulphuric acid producing plant of the lead chamber type. For the purification of the gases, which will carry some dust, I prefer to provide a precipitator which may be an electric precipitator or a rod dust collector such as 37 communicating at one end by means of the dust with the roasting furnace 32, and communicating at the other end by means of a duct 39 with the Glover tower 40 of the sulphuric acid plant, the sulphuric acid plant comprising the usual lead chambers 41 communicating with the Glover tower 40 and the Gay Lussac towers 42. As this type of plant is well known in the arts the same has been only diagrammatically illustrated in the drawing. The plant preferably comprises the same equipment as in ordinary plant practice with all modern improvements, the nitre being supplied, for example, in the form of nitric oxides produced from ammonia by the well known ammonia oxidizing process illustrated generally as 43, a preferred ammonia oxidizing apparatus being one as shown and described in the copending application of Hechenbleikner and Titlestad, Serial No. 192,462, filed May 18, 1927, now Patent No. 1,748,646, dated February 25, 1930.

By means of this process I am enabled, as aforestated, to produce sulphuric acid of about 60° Bé. Due to the fact that the gases obtained from the roasting contain 6% SO$_2$ and also a considerable amount of carbon dioxide, it is desirable to employ a larger chamber system than is usually used in the standard sulphuric acid plant. The high concentration of sulphuric acid producible in this step of the process is due in greater part to the roasting step where the sulphur dioxide is driven off most economically, and where optimum concentration is effected, and is also due to the low aqueous content sulphate produced in the drying or evaporating step.

(4) *Sintering:*—The iron oxide obtained from the roasting furnace 32 and from the dust collector 37 are led as shown by the arrowed lines 44 and 45 to a screw conveyor 46 and thence to an elevator 47 feeding the same to the hopper 48 leading to a sintering machine 49. Into the hopper 48 of the sintering machine is also fed pulverized fuel coming from the pulverizer 32, as shown by the arrow line 50. The fuel content for the complete process charge employed in the pulverizer 33 is shown by the legend block 25 and arrowed lead line 26a, this being subdivided into about 20 tons for the roasting step and 6 tons for the sintering step, all as diagrammatically shown in the drawing. For the sintering machine about 35 gallons of oil are used, as shown by the legend block 50 and the arrowed lead line 51.

The cinder coming from the roasting furnace contains from 1 to 3% of sulphur, and after the same is sintered in the machine 49 which may be, for example, a Dwight-Lloyd machine, the sulphur content is reduced to less than $\frac{1}{10}$%, which gives a product that can be used over again in the blast furnaces.

The final comparative yields of the sulphuric acid plant and the sintering machine are shown by the legend blocks 52 and 53 respectively.

The method of practicing the process and the use of the apparatus of my invention, and the many advantages thereof will, in the main, be fully apparent from the above detailed description thereof. It will be further apparent that while I have described the process and the plant layout specifically, showing the practice of the steps in the preferred manner, and while I have referred to specific relative proportions of charges and ingredients used, I may make many changes and modifications, both in the structure and in the steps of the process without departing from the spirit of the invention which is defined in the following claims.

I claim:
1. In the method of reclaiming pickling solution, the step which consists in roasting a mixture of an iron sulphate and coal, the said mixture containing coal of an amount of the order of 12% of said mixture.

2. In the method of reclaiming pickling solution, the step which consists in roasting a mixture of coal and a dried iron sulphate containing one molecule of water or less to produce sulphur dioxide gas and iron oxide, the said mixture containing coal of an amount of the order of 12% of said mixture.

3. In the method of reclaiming pickling solution, the step which consists in roasting a mixture of a dried powdered iron sulphate and powdered coal, the said mixture containing coal of an amount of the order of 12% of said mixture.

4. In the method of reclaiming pickling solution, the step which consists in roasting a mixture of a dried iron sulphate and coal to produce sulphur dioxide gas and iron oxide, the proportions of coal and sulphate in the mix being in the proportion of the order of one pound of coal to dried sulphate obtained from 2.2 gallons of 30° Bé. pickling solution.

5. In the method of reclaiming iron sulphate, the step which consists in roasting a mixture of coal and the substantially dehydrated iron sulphate to produce sulphur dioxide gas and an oxide of iron, the said mixture containing coal of an amount of the order of 12% of the mixture.

INGENUIN HECHENBLEIKNER.